Aug. 24, 1965

C. DRADER 3,202,295

SIDE OPENING CARRIER

Filed Feb. 4, 1964

INVENTOR.
*CLARENCE DRADER*
BY
*George B White*
ATTORNEY

United States Patent Office 3,202,295
Patented Aug. 24, 1965

3,202,295
SIDE OPENING CARRIER
Clarence Drader, R.R. 2, South Edmonton,
Alberta, Canada
Filed Feb. 4, 1964, Ser. No. 342,413
2 Claims. (Cl. 211—126)

This invention relates to improvements to foldable carriers for bread, produce and the like.

Foldable carriers of the type comprising a base framework with carrying bails journalled to the framework and foldable with respect to the framework are now in common use. Such carriers consist generally of a framework with carrying bails journalled to the framework and lugs attached to the framework to co-act with the carrying bails when the carriers are stacked and prevent lateral shifting of a column of stacked carriers.

In general, these carriers include the base framework with the carrying bails at the ends of the framework and, if sides for the carrier are provided, these generally are some form of telescoping rail that will shorten in length as the carrying bails are folded to the framework or, they comprise an additional side that is foldable inwardly into the framework and that will snap into locking contact with the carrying bails when moved to a vertical position.

The chief difficulty with carriers of this type lies in the fact that when the carriers are stacked, it is impossible to get at the contents of a carrier in the stack without unstacking the carriers.

Because of this, it has been the custom to use the carriers only for transporting material and to transfer the contents of the carrier to open bins or other containers where the contents will be accessible.

To overcome the above and other difficulties now found in carriers of this class, I have developed a carrier wherein the carrier sides are journalled to the carrier framework and are movable outwardly with respect to the framework so that material may be taken out of or placed in the carrier when the carrier is in a stacked column.

In my improved carrier, I have provided both carrier sides that may be opened if desired by a simple one-handed operation and that may be closed by a simple one-handed operation when desired.

At the same time, I have provided my carrier so that the ends and sides still may be folded inwardly with respect to the framework to reduce the carrier to small size for transporting or storage purposes.

In the construction of carriers of this type, it is desirable to use spring-steel for the working parts of the carrier. It is well-known that it is difficult to weld spring-steel for a satisfactory joint and therefore, I have constructed my carrier using only mechanical securement of the various parts to provide a carrier of adequate strength without the necessity of attempting to weld the spring-steel used in the carrier construction.

In drawings illustrating a preferred embodiment of my improved carrier:

Figure 2:
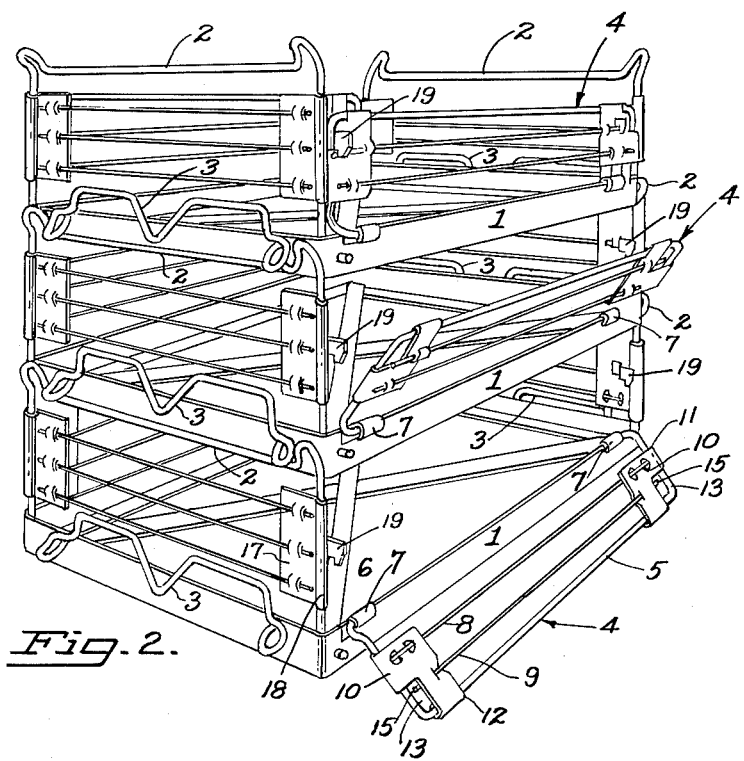
FIG. 2 is a projected view showing three carriers in stacked relationship with the side of the bottom carrier fully opened, the side of the second or middle carrier partially open and the side of the uppermost carrier completely closed.

As seen in the drawings, my carrier comprises the base framework indicated generally at 1 which has the carrying bails 2—2 journalled rotatably at the ends of the base framework 1. As is common, the carrying bails 2 are foldable inwardly with respect to the framework 1 to lie within the framework as the carrier is transported or stored. The base 1 is provided with stacking lugs 3 which co-act with the carrying bails 2 as seen in FIG. 2 in the drawings to lock the carriers together when stacked in a column.

My invention resides in the carrier sides one of which is indicated generally at 4 and comprises the outer member 5 bent as indicated and journalled at its ends 6—6 in sleeves 7—7 secured to the framework 1.

Spaced rails 8 and 9 are secured in the member 5 by the L-shaped rail members 10 which are crimped at 11 and 12 over the end and top of the member 5 to provide the opening 13 at the end of the member 5. The rail 8 is secured at 14 in the rail member 10 while the rail 9 extends at its ends 15—15 through openings 16 in the rail members 10 and projects into the opening 13.

Catch members 17 are crimped at 18 to the carrying bails 2 and catches 19 secured to the catch members are positioned to enter the openings 13 when the side 4 is raised to the vertical position with the ends 15 of the rail 9 engaging in slots 20 in the catches 19. The catches 19 are each formed with a rounded nose 21 to force the ends 15 of the rail 9 downwardly and past the nose 21 so that they may spring into the slots 20 to lock the side 4 with relation to the carrying bails 2.

In operation, the sides 4 can be raised as desired to engage the ends 15 of the rail 9 in the catches 19 and the carrier would then be formed with raised end and side portions as indicated by the uppermost carrier in the stack of carriers in FIG. 2 in the drawings.

Figure 1:
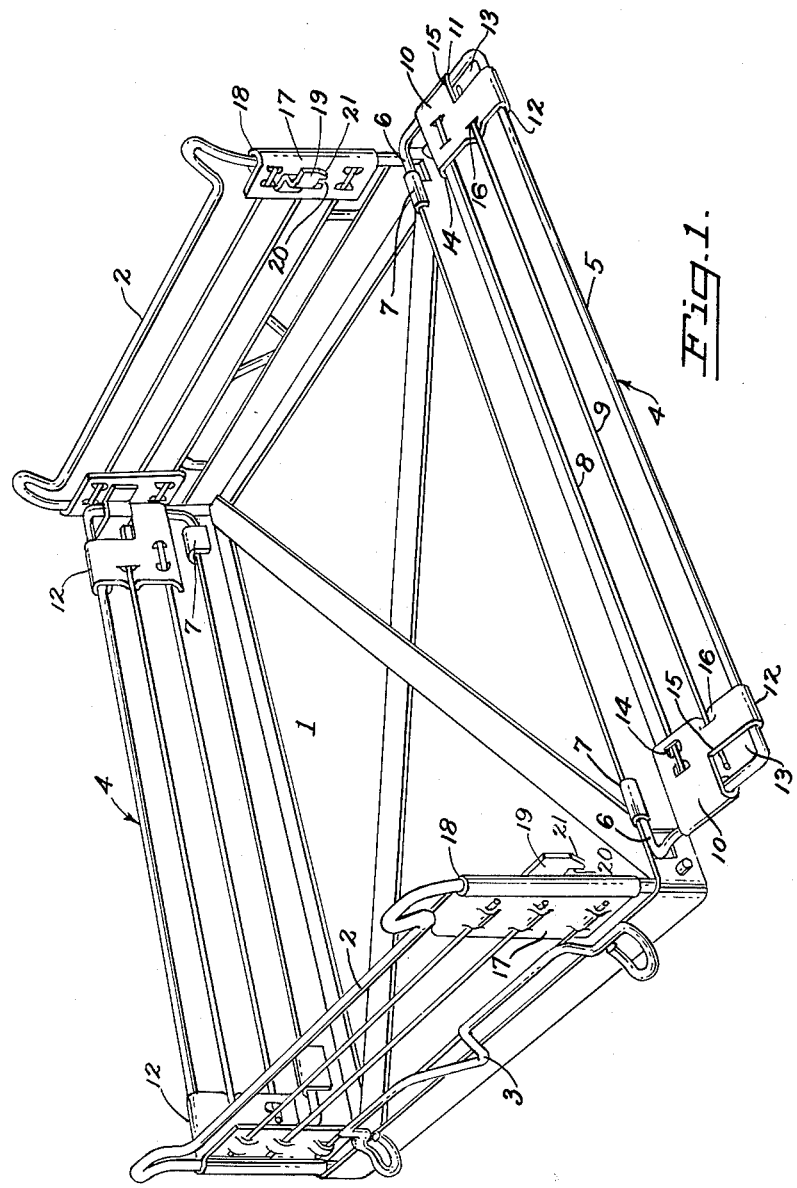
FIG. 1 is a projected view of my carrier with one side opened.

To release either side 4 of the carrier, it is necessary only to grasp the rail 9 at substantially its center and move the rail 9 towards the member 5. This will move the ends 15 of the rail away from or out of the slots 20 and the carrier side may then be opened as indicated in FIG. 1 in the drawings. Obviously, if the carriers are stacked as indicated in FIG. 2, material may then be taken out of or placed in the desired carrier in the stack and when the side 4 is raised the ends 15 will once again seat in the slots 20 of the catches 19.

If it is desired to fold the carrier for transport or storage purposes, it is only necessary to release both of the sides 4, open the sides, fold the carrying bails 2—2 inwardly to lie against the base framework 1 and then fold the sides 4 on top of the carrying bails 2.

I claim:

1. In a carrier having a base framework with carrying bails journalled rotatably at opposite ends of the framework and movable from an upright to a folded position with respect to the framework, carrier sides journalled rotatably at opposite sides of the framework, means securing the sides in an upright position to the carrier bails when the carrier bails are in an upright position, such means being releasable manually to allow the sides to be opened with respect to the carrier, the means for securing the sides in an upright position comprises catches positioned on the carrying bails to project laterally on both sides of the carrier, and a rail contained in each carrier side, such rail positioned to engage at its ends with the catches projecting from the bails, said rail being resiliently flexible so that it may be distended manually to release the ends of the rail from the catches and allow the carrier side to be moved outwardly with respect to the carrier.

2. In a carrier having a base framework with carrying bails journalled rotatably at opposite ends of the framework and movable from an upright to a folded position with respect to the framework so as to be folded into said framework, carrier sides journalled on opposite sides of said framework so as to be foldable from an upright position into said framework in superimposed relation to said bails, and releasable co-acting elements on said bails and uprights to secure said carrier sides to said bails in upright position, each carrier side including a skeleton frame, and said co-acting elements being a catch plate at each end of said skeleton frame forming a recess at the adjacent corner of the catch plate, a resiliently yieldable bar slidably held in said catch plates and having its ends projecting into the respective recesses, and a lug extended from each side of each bail into the adjacent recess into engagement with said bar so as to be releasable by bowing the bar thereby withdrawing said ends of said bar from the respective recesses and lugs.

References Cited by the Examiner

UNITED STATES PATENTS

| 2,666,552 | 1/54 | Coit | 220—97 |
| 2,780,382 | 2/57 | Beckner | 220—6 |
| 2,814,390 | 11/57 | Burbier | 211—126 |
| 2,994,463 | 8/61 | Drader | 224—48 |

CLAUDE A. LE ROY, *Primary Examiner.*